United States Patent [19]

O'Donnell et al.

[11] Patent Number: 5,112,933
[45] Date of Patent: May 12, 1992

[54] ETHER-BASED POLYURETHANE ELEVATOR SHEAVE LINER-POLYURETHANE-UREA MADE FROM POLYETHER URETHANE PREPOLYMER CHAIN EXTENDED WITH POLYESTER/DIAMINE BLEND

[75] Inventors: Hugh J. O'Donnell, Longmeadow, Mass.; Vincent J. Gajewski, Cheshire, Conn.; Knizley James B., Woodbury, Conn.; Richard L. Palinkas, Northfield, Conn.; Ronald O. Rosenberg, Shelton, Conn.

[73] Assignee: Otis Elevator Company, Farmington, Conn.

[21] Appl. No.: 686,102

[22] Filed: Apr. 16, 1991

[51] Int. Cl.$^5$ .............................................. C08G 18/10
[52] U.S. Cl. ...................... 528/61; 528/63; 528/64; 254/393; 474/168
[58] Field of Search .................... 528/64, 63, 61; 254/393; 474/168

[56] References Cited

U.S. PATENT DOCUMENTS

| | | | |
|---|---|---|---|
| 3,279,762 | 10/1966 | Bruns | 254/190 |
| 4,327,204 | 4/1982 | Oyaizu et al. | 528/63 |
| 4,507,459 | 3/1985 | Schmidt et al. | 528/63 |

Primary Examiner—Maurice J. Welsh
Assistant Examiner—Rachel Johnson
Attorney, Agent, or Firm—George J. Romanik

[57] ABSTRACT

An ether-based polyurethane article comprises a toluene diisocyanate-terminated polyether polyol prepolymer cured with a blended polyester polyol/diamine curative. The article may be made by mixing a toluene diisocyanate-terminated polyether polyol prepolymer with a blended polyester polyol/diamine curative to form a reaction mixture. A suitably shaped mold is preheated and filled with the reaction mixture with sufficient pressure to displace air in the mold. The reaction mixture is held in the preheated mold to cure the reaction mixture and form the article. The cast article is removed from the mold and post-cured to complete the chemical cross-linking reaction.

30 Claims, 2 Drawing Sheets

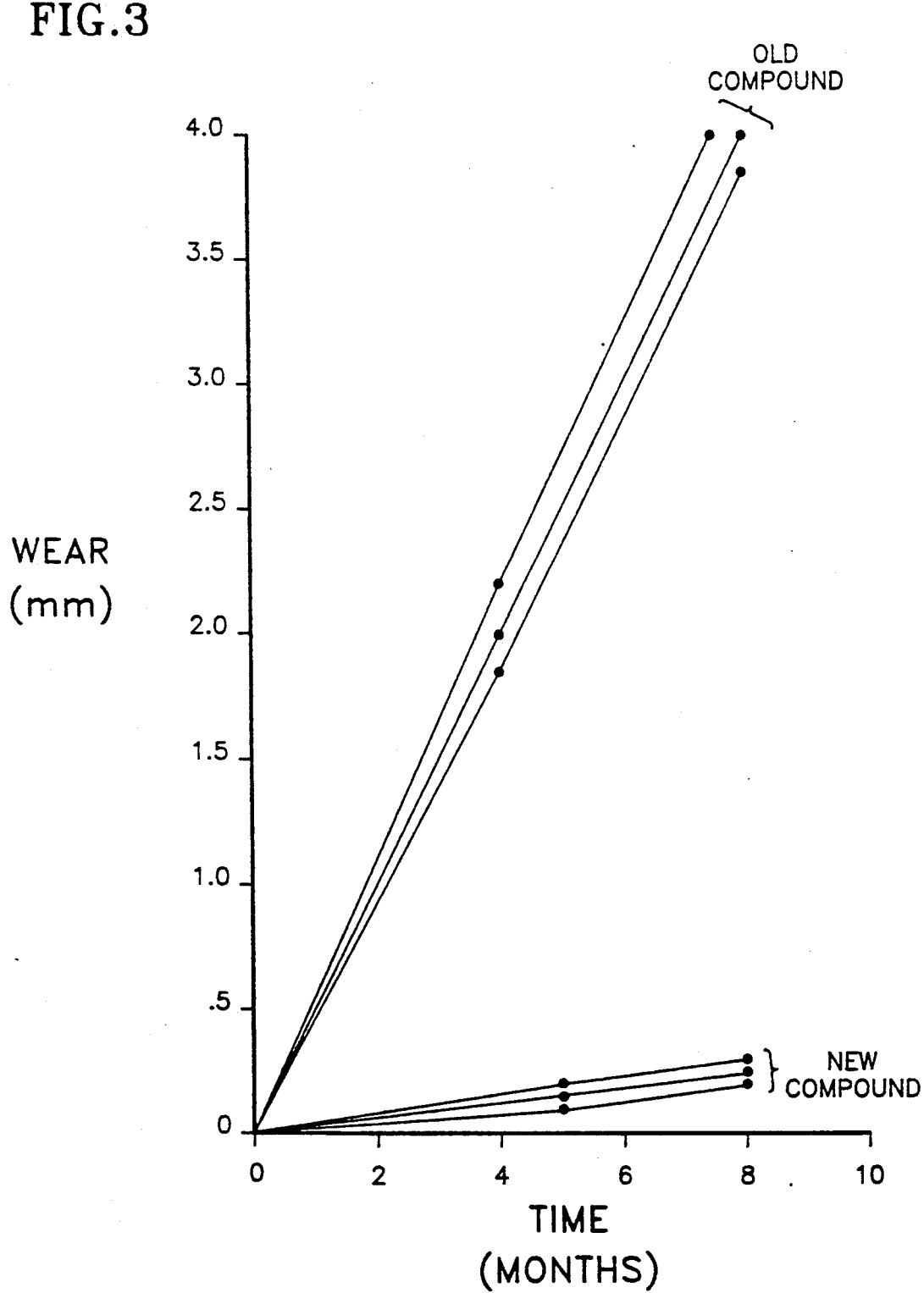

ETHER-BASED POLYURETHANE ELEVATOR SHEAVE LINER-POLYURETHANE-UREA MADE FROM POLYETHER URETHANE PREPOLYMER CHAIN EXTENDED WITH POLYESTER/DIAMINE BLEND

DESCRIPTION

1. Technical Field

The present invention is directed towards resilient polyurethane articles in general and polyurethane elevator sheave liners in particular.

2. Background Art

The advent of high rise building construction during the late 19th and early 20th centuries sparked the development of electric traction elevators to provide quick, convenient, and reliable transportation between floors. Today, electric traction elevators are used throughout the elevator industry in a wide range of applications.

Traction elevators are driven by machines which incorporate an electric motor and a drive sheave to transmit the rotational output of the motor to hoisting ropes which raise and lower the elevator car and counterweight. The drive sheave is a metal wheel with grooves in which the ropes ride. The use of drive sheaves in elevator drive machinery introduces a condition commonly known as slip into elevator operation. Slip is an ordinarily undesirable condition which occurs when there is insufficient friction between the ropes and sheave to provide the traction necessary to maintain complete and positive control over the movement of the elevator car and counterweight. While slip is undesirable under ordinary operating conditions, it becomes a highly desirable safety feature known as slipping traction when either the car or counterweight becomes jammed or lands on its buffer. In these situations, the ropes must lose traction with the drive sheave to permit the drive machine to continue running without transmitting a driving force to the rope. Slipping traction prevents the car or counterweight from being pulled into an uncontrolled ascent, which can be followed by an uncontrolled descent due to accumulated slack rope. Elevator safety codes worldwide often require elevators to be capable of slipping traction.

Because of the conflicting effects of slip, the coefficient of friction between the ropes and sheave must fall into a relatively narrow range which, on the one hand, permits sufficient traction to be developed under normal operating conditions, but which, on the other hand, permits slipping traction when necessary. One way of providing an acceptable amount of friction between the ropes and sheave is to insert a sheave liner into the grooves in the sheave in which the ropes ride. A sheave liner is described in U.S. Pat. No. 3,279,762 to Bruns. Typically, sheave liners are made from a pliable, ester-based polyurethane which is cast into hoops which fit snugly into the sheave grooves with an interference fit. The sheave liners themselves may be grooved to further increase traction and to prevent the accumulation of lubricants between the rope and sheave liner. Sheave liners permit the amount of friction between the ropes and sheave to be tailored to meet engineering traction demands and can increase rope life by eliminating metal to metal contact between the ropes and sheave. In addition, sheave liners act as vibration dampers to improve ride quality in the car and can decrease the size of the drive machinery needed for a particular application, while increasing car speed and lift capacity.

Although sheave liners have been used for many years to improve elevator operation, experience has shown that liners made of conventional polyurethane materials are subject to degradation which can hamper elevator operations or impose substantial maintenance costs. For example, ester-based polyurethane sheave liners which are exposed to combinations of high heat, high humidity, and rope lubricants undergo a chemical degradation which can increase the liner's coefficient of friction, compression set, and extension set, and decrease the liner's tensile strength, compressive strength, abrasion resistance, and tear resistance. As a result, the liner can degrade quickly. In addition, the coefficient of friction between the rope and sheave can increase to a point where slipping traction becomes difficult to achieve. As a result of these problems, sheave liner service lives can be as short as a few months and are only infrequently longer than one year. Because replacing a sheave liner typically takes two workers two to four days, the maintenance costs associated with rapid sheave liner degradation and wear are extremely high. Costs can be further increased if maintenance workers stop lubricating the ropes in an effort to prevent sheave liner degradation. The lack of rope lubrication merely increases the friction between the ropes and liners and increases the rate of sheave liner degradation and rope wear.

Accordingly, what is needed in the industry is a sheave liner which has a long service life; resists degradation caused by exposure to heat, humidity, and lubricants; has high tensile and compressive strengths; is highly resistant to abrasion, compression set, extension set, and tear; and can produce acceptable traction.

DISCLOSURE OF THE INVENTION

The present invention is directed towards a sheave liner which has a long service life; resists degradation caused by exposure to heat, humidity, and lubricants; has high tensile and compressive strengths; is highly resistant to abrasion, compression set, extension set, and tear; and can produce acceptable traction.

One aspect of the invention includes an ether-based polyurethane article comprising a toluene diisocyanate-terminated polyether polyol prepolymer cured with a blended polyester polyol/diamine curative.

Another aspect of the invention includes a method of casting an ether-based polyurethane article. A toluene diisocyanate-terminated polyether polyol prepolymer is mixed with a blended polyester polyol/diamine curative to form a reaction mixture. A suitably shaped mold is preheated to about 220° F. to about 250° F. and filled with the reaction mixture with sufficient pressure to displace air in the mold. The reaction mixture is held in the preheated mold for about 50 minutes to about 90 minutes to cure the reaction mixture and form the article. The cast article is removed from the mold and post-cured at about 220° F. to about 250° F. for about 14 hours to about 18 hours to complete the chemical cross-linking reaction.

The foregoing and other features and advantages of the present invention will become more apparent from the following description and accompanying drawings.

BRIEF DESCRIPTION OF THE DRAWINGS

FIG. 3 is a graph which compare wear rate data for sheave liners of the present invention with comparable data from prior art sheave liners.

BEST MODE FOR CARRYING OUT THE INVENTION

Figure 1:
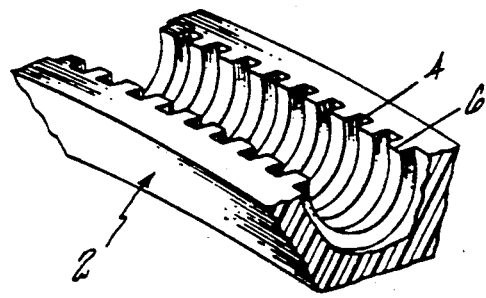
FIG. 1 is a perspective view of a portion of an elevator sheave liner.
Figure 2:
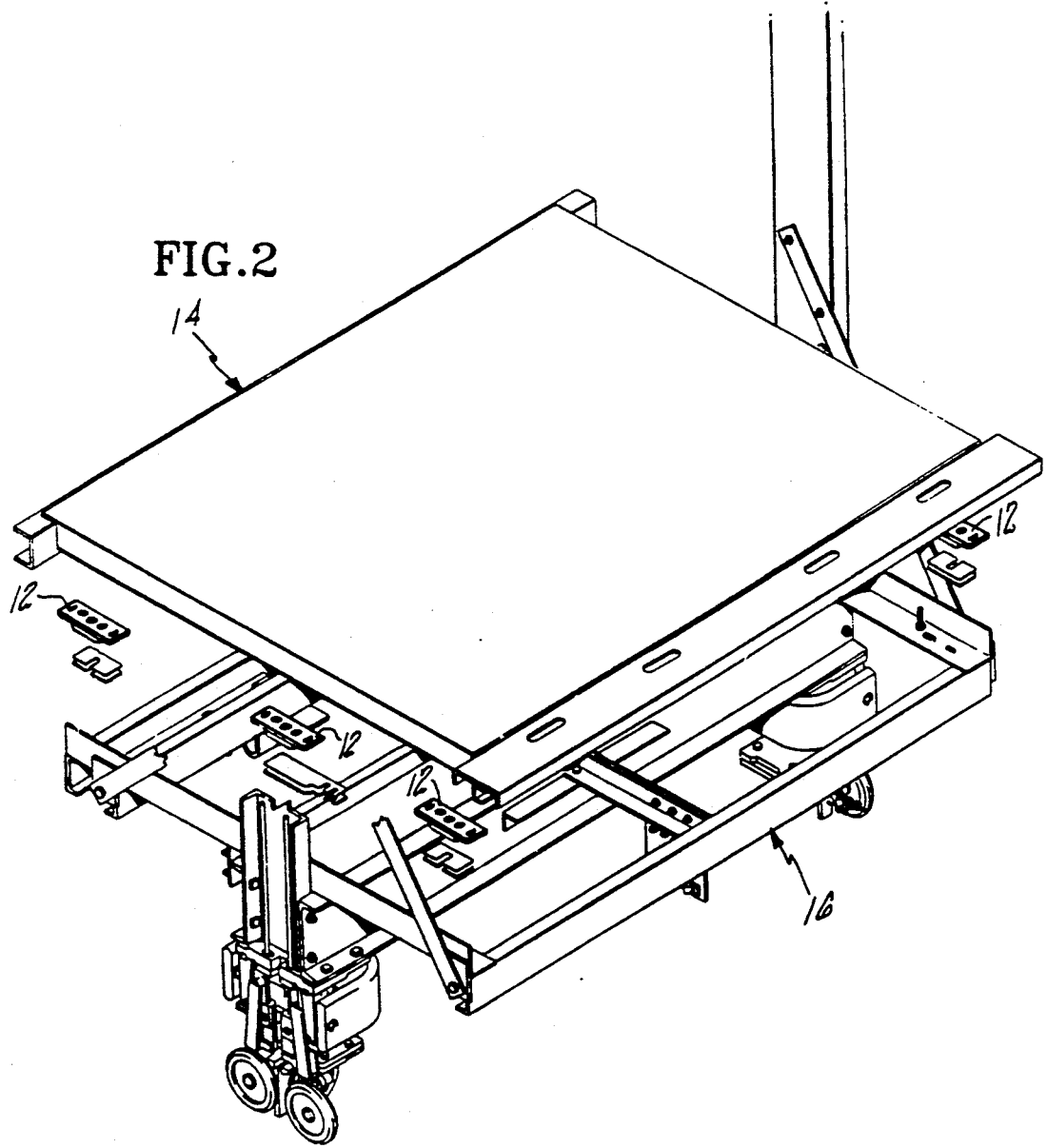
FIG. 2 is an exploded, perspective view of the underside of an elevator car showing a plurality of isolation pads.

The present invention uses a novel, thermoset, castable, ether-based polyurethane elastomer to make elevator sheave liners and other resilient articles such as elevator isolation pads. The sheave liner of the present invention may be made in any conventional configuration which is known in the art. For example, FIG. 1 shows a portion of a polyurethane sheave liner 2 which has a series of grooves 4 alternating with a series of treads 6 to aid in maintaining traction between the rope and sheave liner. The sheave liner may be cast as a continuous hoop or as a strip which may be cut to a suitable length and bonded into a hoop in the field. Bonding may be accomplished by any conventional technique used to field bond two pieces of similar polyurethane. FIG. 2 shows a plurality of polyurethane isolation pads 12 positioned between an elevator car platform 14 and a support frame 16. The isolation pads 12 are blocks of polyurethane which may be mounted between the platform 14 and frame 16 in any conventional way to provide sound and vibration deadening.

In order for the sheave liner to have a long service life, the polyurethane elastomer of the present invention should resist degradation due to exposure to heat, especially ambient temperatures of about 90° F. to about 130° F.; humidity, especially relative humidities of about 80% to about 95%; and lubricating oils and greases, especially acidic petroleum-based rope lubricants. In addition, the polyurethane should have a high tensile strength to prevent rope pressure from extruding the liner and be highly resistant to compression and extension set so that the liner will return to its original shape after being subjected to rope pressure. In particular, the polyurethane of the present invention should have a hardness as measured by an ASTM D-2240 test of about 80 Shore A to about 92 Shore A, a tensile strength as measured by an ASTM D-412 test of about 3000 pounds per square inch (psi) to about 5500 psi, a 100% modulus as measured by an ASTM D-412 test of about 500 psi to about 1300 psi, a percent elongation as measured by an ASTM D-412 test of about 400% to about 600%, an extension set as measured by an ASTM D-412 test of about 20% or less, a tear resistance as measured by an ASTM D-470 test of about 50 pounds per linear inch (pli) or more, and a compression set as measured by an ASTM D-395 method B test for 22 hours at 158° F. and 25% deflection of about 30% or less. Preferably, the material will have a hardness of about 84 Shore A to about 87 Shore A, a tensile strength of about 4500 psi to about 5500 psi, a 100% modulus of about 650 psi to about 1300 psi, a percent elongation of about 400% to about 600%, an extension set of about 5% or less, a tear resistance of about 60 pli or more, and a compression set of about 20% or less. Most preferably, the material will have a hardness of about 85 Shore A, a tensile strength of about 5000 psi, a 100% modulus of about 690 psi, a percent elongation of about 520%, an extension set of about 5%, a tear resistance of about 65 pli, and a compression set of about 15%. In addition, the polyurethane of the present invention should be capable of providing an available traction ratio, the ratio of the rope load on the more heavily loaded side of the drive sheave to the load on the other side of the sheave, of about 1.40 to about 1.80.

To achieve these properties, the polyurethane elastomer of the present invention is made from a toluene diisocyanate-terminated polyether polyol prepolymer cured with a blended polyester polyol/diamine curative. The polyol used to make the prepolymer may be any commercially available polyether polyol. In particular, polyethers such as polyethylene glycol (PEG), polypropylene glycol (PPG), polytetramethylene ether glycol (PTMEG), polyalkylene triols such as polypropylene triol, and polyalkylene dithiol may be suitable polyether polyols. PTMEG is the preferred polyether polyol because it can provide the polyurethane of the present invention with the desired resistance to chemical degradation and many of the desired mechanical properties.

The prepolymer may be made by reacting the polyether polyol described above with a commercially available toluene diisocyanate (TDI), such as 100% 2,4 TDI isomer, an 80%/20% blend of the 2,4 and 2,6 TDI isomers, or a 65%/35% blend of the 2,4 and 2,6 TDI isomers. The 80%/20% blend is preferred because it can provide the polyurethane of the present invention with the desired mechanical and dynamic properties and processing characteristics. The ratio of TDI to polyol in the prepolymer is commonly expressed as the NCO:OH ratio. For the present invention, the NCO:OH ratio may be about 1.6:1.0 to about 2.3:1.0. Preferably, the ratio will be about 1.7:1.0 to about 2.2:1.0 and most preferably, about 1.95:1.0 to about 2.15:1.0. Suitable prepolymers are commercially available from Uniroyal Chemical Company, Inc. (Middlebury, CT) under the trade name Adiprene ®, especially Adiprene ® L 367.

As is known in the art, a curative is used to join or cure the prepolymer molecules to form the polyurethane. The curative used with the present invention should be a blend of a polyester polyol and a diamine. The polyester polyol may be any commercially available polyester polyol which is substantially resistant to hydrolysis. The preferred polyester polyol is polycaprolactone (PCL) because of its good hydrolysis resistance and frictional characteristics. PCL is commercially available from Uniroyal Chemical Company under the trade name Vibracure ® A 150. The diamine may be any commercially available diamine curative. For example, the diamine may be 4,4'-methylene-bis(2-chloroaniline) (MBOCA), dimethylthiotoluene diamine (DMTDA), methylene-bis-chlorodiethylaniline (MCDEA), trimethylene-di-p-aminobenzoate, 2,2',5-trichloro-4,4'-methylenediamines, naphthalene-1,5-diamine, ortho-, meta-, and para-phenylenediame, toluene-2,4-diamine, dichlorobenzidine, or diphenylether-4,4'-diamine. The preferred diamine is MBOCA because it is readily available and its properties are well understood. Suitable diamines are commercially available from PDS, Incorporated as Bisamine A (MBOCA), Ethyl Corporation as Ethacure ® 300 (DMTDA), and Lonza, Incorporated as Lonzacure ® (MCDEA). The polyester polyol and diamine may be blended to provide a mole ratio of polyester polyol/diamine of about 10/90 to about 90/10. Preferably, the mole ratio will be about 30/70 to about 70/30. Most preferably, the mole ratio will be about 30/70 to about 50/50.

To produce a polyurethane with the desired properties, the prepolymer and curative should be mixed in a particular molar equivalence ratio to form a reaction mixture. The equivalence ratio may be expressed as a percent of the theoretical stoichiometric ratio of curative to prepolymer and may also be referred to as the stoichiometry or percent of theory. To make the polyurethane of the present invention, the equivalence ratio should be about 85 to about 100. Preferably, the equivalence ratio will be about 90 to about 95, and most preferably about 90. As is known in the art, a catalyst may be added to the reaction mixture to accelerate the reaction and shorten the demold time. Any conventional catalyst, including a tertiary amine such as triethylene diamine, or a metal catalyst such as organotin, may be used with the present invention. The preferred catalyst is a mixture of 33 weight percent (wt%) triethylene diamine catalyst and 67 wt % dipropylene glycol carrier which is available under the trade name Dabco® 33LV from Air Products and Chemicals, Inc. (Allentown, Pa.). In general, the amount of catalyst used is not critical and the amount can be varied to trade off a shorter demold time against a longer pot life. If a catalyst similar to Dabco® 33LV is used, quantities of about 0.150 parts per 100 parts prepolymer or less may be appropriate. Preferably, about 0.075 parts catalyst per 100 parts prepolymer should be used.

The polyurethane articles of the present invention, including sheave liners and isolation pads, may be cast according to any conventional polyurethane prepolymer casting techniques. For example, a suitably shaped mold may be preheated to a temperature of about 220° F. to about 250° F. and filled with a reaction mixture of an appropriate prepolymer and curative. The reaction mixture should be added to the preheated mold under sufficient pressure to displace all air in the mold. A pressure of about 65 psi (450 kPa) or more may be sufficient. Once the preheated mold has been filled with the reaction mixture, the reaction mixture may be held at the mold temperature for about 50 minutes to about 90 minutes to cure the reactants. The mold may then be opened and the article may be demolded and post-cured at a temperature of about 220° F. to about 250° F. for about 14 hours to about 18 hours in order to complete the chemical cross-linking reaction.

EXAMPLE

A blended polyester polyol/diamine curative was prepared by mixing Vibracure® A 150 (Uniroyal Chemical Company, Inc., Middlebury, Conn.), a commercially available form of PCL, with a commercially available form of MBOCA available from MVR Corporation (New York, N.Y.), in quantities sufficient to produce a blend having a mole ratio of PCL to MBOCA of about 30/70. The curative was mixed with Adiprene® L 367 (Uniroyal Chemical Company), a TDI-terminated PTMEG prepolymer, in an equivalence ratio of 90 to produce a reaction mixture. 0.075 parts of Dabco® 33LV (Air Products and Chemicals, Inc., Allentown, Pa.) catalyst were added per 100 parts of Adiprene® L 367 to accelerate the reaction. While the reaction mixture was prepared, a mold having a cavity shaped like a sheave liner was preheated to 240° F. The reaction mixture was added to a preheated mold at a pressure of about 100 psi to ensure that all air in the mold was displaced and held at 240° F. for 60 minutes to cure the reactants. The mold was then opened and the sheave liner was demolded and post-cured at 240° F. for about 16 hours. The casting operation was repeated to make several sheave liners. The sheave liners were cast in the form of straight lengths having a length of 99.25 inches (in), a height of 0.75 in, a top width of 0.88 in, and a bottom width of 0.41 in. After post-cure, one of the sheave liners was tested to determine its mechanical properties. These properties are reported in Table 1 along with data from a prior art sheave liner.

TABLE 1

| Property | Present Invention | Prior Art |
|---|---|---|
| Hardness (Shore A) | 85 | 80 |
| 100% Modulus (psi) | 690 | 450 |
| 300% Modulus (psi) | 1250 | 600 |
| Tensile Strength (psi) | 4980 | 6500 |
| Elongation (%) | 520 | 630 |
| Compression Set (%) | 15 | 30 |
| Extension Set (%) | 5 | 8 |

The other liners were installed on sheaves on three gearless 219HT Otis elevators (Otis Elevator Company, Farmington, Conn.) where they were exposed to temperatures of up to about 125° F., relative humidities of up to about 95%, and conventional elevator rope lubricants such as Ironsides #7 (D.A. Smart Company, Willowbrook, Ill.) and Vitalife 600 (American Oil & Supply, Newark, N.J.). Preliminary tests to confirm laboratory results on available traction and ride effects showed that the newly installed sheave liner produced acceptable traction and ride quality. After installation, the liners were monitored at monthly intervals for eight months to gauge the wear rate, chemical degradation, available traction, and ride quality. The material showed very low wear rates and no detectable chemical degradation over the test period. Available traction and ride quality remained acceptable over the period. FIG. 3 compares wear data obtained from the sheave liners made according to this example with data obtained from prior art sheave liners used on the same machines. The very low wear rates for the sheave liners of the present invention are due to the lack of chemical degradation and indicate that the sheave liners of the present invention are less susceptible to heat, humidity, and lubricants than prior art sheave liners. In addition to low wear rates, the sheave liners of the present invention had stable mechanical properties throughout the test period. As a result, it is anticipated that wear due to friction between the rope and line will be the only mechanism which will require eventual sheave liner replacement. Sheave liners of the present invention exposed to conditions similar to those prevailing in this test may have service lives of about 4 to 5 years, as compared with prior art sheave liners which could have service lives of no more than about 8 months under comparable conditions.

The present invention can be used to produce a wide range of polyurethane articles which do not degrade when exposed to heat, humidity, or lubricants; have high tensile and compressive strengths; and are highly resistant to abrasion, compression set, extension set and tear. As a result, elevator sheave liners made according to the present invention will have service lives several times longer than prior art sheave liners.

Although the present invention was described in the context of elevator sheave liners and isolation pads, one skilled in the art will realize that the present invention is suitable for other applications in the elevator industry and applications in other industries, such as the automotive and aerospace industries.

It should be understood that the invention is not limited to the particular embodiments shown and described herein, but that various changes and modifications may be made without departing from the spirit or scope of the claimed invention.

We claim:

1. An ether-based polyurethane article, comprising a toluene diisocyanate-terminated polyether polyol prepolymer cured with a blended polyester polyol/diamine curative.

2. The article of claim 1 wherein the polyether polyol is a polytetramethylene ether glycol.

3. The article of claim 1 wherein the prepolymer has a NCO:OH ratio of about 1.6:1.0 to about 2.3:1.0.

4. The article of claim 1 wherein the polyester polyol is polycaprolactone.

5. The article of claim 1 wherein the diamine is 4,4'-methylene-bis(2-chloroaniline).

6. The article of claim 1 wherein the curative has a mole ratio of polyester polyol to diamine of about 10/90 to about 90/10.

7. The article of claim 1 wherein the polyurethane has a equivalence ratio of curative to prepolymer of about 85 to about 100.

8. The article of claim 1 wherein the article has a hardness of about 80 Shore A to about 92 Shore A, a tensile strength of about 3000 psi to about 5500 psi, a 100% modulus test of about 500 psi to about 1300 psi, a percent elongation of about 400% to about 600%, an extension set of about 20% or less, a tear resistance of about 50 pli or more, and a compression set of about 30% or less.

9. The article of claim 1 wherein the article is an elevator sheave liner.

10. The article of claim 1 wherein the article is an elevator isolation pad.

11. An ether-based polyurethane elevator sheave liner, comprising a toluene diisocyanate-terminated polytetramethylene ether glycol polyol prepolymer cured with a blended polycaprolactone/4,4'-methylene-bis(2-chloroaniline) curative.

12. The sheave liner of claim 11 wherein the prepolymer has a NCO:OH ratio of about 1.6:1.0 to about 2.3:1.0.

13. The sheave liner of claim 11 wherein the curative has a mole ratio of polycaprolactone to 4,4'-methylene-bis(2-chloroaniline) of about 10/90 to about 10/90.

14. The sheave liner of claim 11 wherein the polyurethane has a equivalence ratio of curative to prepolymer of about 85 to about 100.

15. The sheave liner of claim 11 wherein the sheave liner has a hardness of about 80 Shore A to about 92 Shore A, a tensile strength of about 3000 psi to about 5500 psi, a 100% modulus test of about 500 psi to about 1300 psi, a percent elongation of about 400% to about 600%, an extension set of about 20% or less, a tear resistance of about 50 pli or more, and a compression set of about 30% or less.

16. A method of casting an ether-based polyurethane article, comprising
(a) mixing a toluene diisocyanate-terminated polyether polyol prepolymer with a blended polyester polyol/diamine curative to form a reaction mixture;
(b) preheating a suitably shaped mold to a temperature of about 220° F. to about 250° F.;
(c) filling the preheated mold with the reaction mixture with sufficient pressure to displace air in the mold;
(d) holding the reaction mixture in the preheated mold for about 50 minutes to about 90 minutes to cure the reaction mixture and form the article;
(e) removing the cast article from the mold; and
(f) post-curing the cast article at about 220° F. to about 250° F. for about 14 hours to about 18 hours to complete the chemical cross-linking reaction.

17. The method of claim 16 further comprising adding a catalyst to the reaction mixture after step (a) in order to accelerate the curing of the reaction mixture.

18. The method of claim 17 wherein the catalyst comprises triethylene diamine.

19. The method of claim 16 wherein the prepolymer comprises a polytetramethylene ether glycol.

20. The method of claim 16 wherein the prepolymer has a NCO:OH ratio of about 1.6:1.0 to about 2.3:1.0.

21. The method of claim 16 wherein the polyester polyol is polycaprolactone.

22. The method of claim 16 wherein the diamine is 4,4'-methylene-bis(2-chloroaniline).

23. The method of claim 16 wherein the curative has a mole ratio of polyester polyol to diamine of about 30/70 to about 70/30.

24. The method of claim 16 wherein the prepolymer and curative are mixed with an equivalence ratio of about 85 to about 100.

25. The method of claim 16 wherein the article is an elevator sheave liner.

26. The method of claim 16 wherein the article is an elevator isolation pad.

27. An ether-based polyurethane elastomer, formed by the reaction of a toluene diisocyanate-terminated polyether polyol prepolymer with a 10/90 to 90/10 curative blend of a polyester polyol/diamine curative.

28. The elastomer of claim 27 wherein the polyether polyol is a polytetramethylene ether.

29. The elastomer of claim 27 wherein the prepolymer has a NCO:OH ratio of about 1.6:1.0 to about 2.3:1.0.

30. The elastomer of claim 27 wherein the polyester polyol is polycaprolactone and the diamine is 4,4'-methylene-bis(2-chloroaniline).

* * * * *